United States Patent [19]

Takezawa et al.

[11] Patent Number: 5,444,100
[45] Date of Patent: Aug. 22, 1995

[54] METHOD FOR THE MIXING OF LOW-BOILING FOAMING AGENT

[75] Inventors: Minoru Takezawa, Ohta; Shigeo Yatsu, Tatebayashi; Fumihisa Endo, Ohta; Akihiro Morita, Ohragun; Yuji Kishi, Ohta, all of Japan

[73] Assignee: Sanyo Electric Co., Ltd., Morigushi, Japan

[21] Appl. No.: 144,804

[22] Filed: Oct. 28, 1993

Related U.S. Application Data

[63] Continuation of Ser. No. 836,133, Feb. 14, 1992, abandoned.

[30] Foreign Application Priority Data

Feb. 22, 1991 [JP] Japan .................. 3-60779

[51] Int. Cl.$^6$ ............................... C08G 18/14
[52] U.S. Cl. .................... 521/131; 521/164; 521/171
[58] Field of Search ............... 422/133, 135; 521/131, 521/164, 171

[56] References Cited

U.S. PATENT DOCUMENTS

| | | | |
|---|---|---|---|
| 4,157,427 | 6/1979 | Ferber | 422/135 X |
| 4,438,072 | 3/1984 | Hothnagel | 422/135 X |
| 4,898,893 | 2/1990 | Ashida | 521/137 |
| 4,972,003 | 11/1990 | Grünbauer et al. | 521/131 |
| 5,000,882 | 3/1991 | Proksa et al. | 422/133 X |
| 5,002,704 | 3/1991 | Kripp et al. | 422/133 X |
| 5,034,425 | 7/1991 | Kuroishi et al. | 521/131 |
| 5,107,068 | 4/1992 | Ozaki et al. | 521/131 X |
| 5,124,366 | 6/1992 | Gluck et al. | 521/131 X |
| 5,182,309 | 6/1993 | Hützen | 512/131 X |
| 5,183,583 | 2/1993 | Wishneski et al. | 521/131 X |
| 5,194,453 | 3/1993 | Jourquin et al. | 521/131 X |
| 5,198,475 | 3/1993 | Kimura et al. | 521/171 X |
| 5,223,547 | 6/1993 | Harada et al. | 521/131 X |
| 5,223,549 | 6/1993 | Wiedermann et al. | 521/131 X |
| 5,225,453 | 7/1993 | Yamamori | 521/131 X |
| 5,234,967 | 8/1993 | Takazawa et al. | 521/131 |
| 5,238,970 | 8/1993 | De Vos | 521/131 X |
| 5,246,978 | 9/1993 | Ozaki et al. | 521/164 |
| 5,252,625 | 10/1993 | McLaughlin et al. | 521/131 X |
| 5,254,600 | 10/1993 | Blanpied et al. | 521/131 X |

FOREIGN PATENT DOCUMENTS 0420272  3/1991  European Pat. Off. .

*Primary Examiner*—Donald E. Czaja
*Assistant Examiner*—Milton I. Cano
*Attorney, Agent, or Firm*—Darby & Darby

[57] ABSTRACT

A method for the mixing of a polyol with a low-boiling foaming agent for the manufacture of a rigid foamed polyurethane. The polyol is blended in advance with a specific amount of the low-boiling foaming agent such as chlorodifluoromethane (designated by HCFC-22) or the like in a liquid state. In this case, it is possible to uniformly supply the polyol and the specific amount of HCFC-22 to a polyurethane foaming system, resulting in a homogeneous foaming reaction whereby a rigid foamed polyurethane having excellent cell uniformity without any voids may be obtained.

19 Claims, 1 Drawing Sheet

METHOD FOR THE MIXING OF LOW-BOILING FOAMING AGENT

This is a continuation of application Ser. No. 07/836,133, filed Feb. 14, 1992 now abandoned.

BACKGROUND OF THE INVENTION

(1) Field of the Invention

This invention relates to an apparatus for the continuous, homogeneous and effective mixing of polyol with low-boiling point foaming agent which are used as raw materials for the manufacture of a rigid foamed polyurethane. More particularly, this invention relates to an apparatus for the mixing of polyol with chlorodifluoromethane, $CHClF_2$ (designated by HCFC-22), chlorodifluoroethane, $CH_3CClF_2$ (designated by HCFC-142b), or the like which are used as low-boiling point foaming agents for the manufacture of the rigid foamed polyurethane of the invention. These low-boiling point foaming agents have a short life in the atmosphere because of the presence of hydrogen atoms in the molecules, and have, therefore, less suspicion of being substances that are eating a hole in the atmosphere's layer of ozone, which consequently are linked to global warming.

(2) Description of the Prior Art

It is known that rigid foamed polyurethanes made up substantially of closed cells, which are manufactured by use of a polyol, an isocyanate, water, trichlorofluoromethane, $CCl_3F$ (designated by CFC-11; boiling point 23.8° C.) as foaming agent, have good mechanical and thermal insulating properties, excellent dimensional stability, sound insulating and electrical properties, and chemical resistance. Accordingly, they are widely used in the making of thermal insulating materials for refrigerators, freezers, chill cars, iceboxes, containers for frozen food, LPG tanks; insulating materials for panels of curtain walls; building materials for roofing or canopies of cold storage warehouses; and various parts of automobiles.

Lowland of the University of California disclosed a theory in 1974 that specific CFCs which include trichlorofluoromethane (CFC-11), dichlorodifluoromethane (designated by CFC-12), trichlorotrifluoroethane (designated by CFC-113), dichlorotetrafluoroethane (designated by CFC-114) and chloropentafluoroethane (designated by CFC-115), are suspected of being ozone-destroying substances. The CFCs have been linked to the cause of an Antarctic hole in the Earth's ozone layer, which screens skin cancer-causing ultraviolet radiation from the sun.

Further, the CFCs are said to have a long-life, for example, for about 100 years in the environment and they absorb infrared light. Therefore, the CFCs are also believed to be so-called greenhouse gases; substances that may contribute to global warming that could cause the earth's temperature to rise with potentially catastrophic effects for health and production of crops.

Their use is strictly regulated in technological by advanced countries and those regulation are expected to be tightened still further in the future.

Their use and production have been regulated in Japan since 1989, and a complete ban on the CFCs production and use will be in effect in the near future. From this point of view, it is an urgent matter to develop substitutes for the CFCs.

CFC-11, which is included in the specific CFCs and used widely in making foamed plastics as a foaming agent, is similarly circumstanced. CFC-11 has a boiling point of 23.8° C., and it liquefies in the closed cells of polyurethane when the polyurethane is used in making thermal insulating materials for a refrigerator, a freezer, or a show case which is maintained at about −30° to −40° C. In this case, the thermal conductivity of the insulating material changes sharply, yielding no effectual thermal insulating results.

Therefore, there is a need to develop a process for the manufacture of a rigid foamed polyurethane by the use of a foaming agent which does not liquefy under such cold conditions and makes the foamed polyurethane retain its low thermal conductivity.

For the mixing of a polyol and a relatively high-boiling point foaming agent such as CFC-11, as raw materials for the manufacture of a rigid foamed polyurethane, a batchwise mixing apparatus has been extensively used. However, it is not possible to convert the batchwise apparatus into a new one used for the mixing of a foaming agent, such as HCFC-22, which vaporizes at ordinary temperatures.

Therefore, there is a need for developing a process for the manufacture of a rigid foamed polyurethane by means of a mixing apparatus by which the polyol and the relatively low-boiling point foamed agent, such as HCFC-22, may be efficiently mixed.

SUMMARY OF THE INVENTION

An object of the present invention is to provide a continuous and efficient apparatus for the homogeneous mixing of a polyol with a low-boiling point foaming agent, such as HCFC-22. The polyol is used as a raw material for the manufacture of a rigid foamed polyurethane.

A further object of the present invention is to provide a continuous and effective apparatus for the homogeneous mixing of a polyol with a low-boiling point foaming agent, such as HCFC-22 or a HCFC-22 blend containing HCFC-142b. The HCFC-22 or HCFC-142b create only a small environmental problem because of the presence of hydrogen atoms in its molecule and the short life in the atmosphere.

A still further object of the present invention is to provide a continuous and efficient apparatus for the homogeneous mixing of a polyol with a nonflammable HCFC-22 blend containing flammable HCFC-142b. The blend is used preferably as a foaming agent for the manufacture of a rigid polyurethane of the invention, which is inflammable while preventing an impairment in the thermal conductivity of the foamed product on standing.

DETAILED DESCRIPTION OF THE INVENTION

According to the first aspect of the invention, there is provided a continuous apparatus for the mixing of a polyol with a low-boiling point foaming agent for the manufacture of a rigid foamed polyurethane, wherein the apparatus comprising a main mixing body of the present apparatus, polyol feed passageways, polyol circulation passageways, and low-boiling point foaming agent feed passageways connected to the polyol circulation passageways. The low-boiling point foaming agent is fed into the polyol through the low-boiling point foaming agent feed passageways under temperatures and pressures sufficient for liquefying the foaming agent.

In the present invention, the polyol is blended in advance with a specific amount of the low-boiling point foaming agent such as chlorodifluoromethane (designated by HCFC-22) or the like. In this case, it is possible to supply uniformly the polyol and the specific amount of HCFC-22 or the like to a polyurethane foaming system by use of a predetermined amount of HCFC-22 dissolved in the polyol at a fixed pressure and temperature, resulting in a homogeneous foaming reaction whereby a rigid foamed polyurethane having excellent cell uniformity without any voids may be obtained.

As to the mixing, it is preferred to carry out the mixing under conditions of low temperature and high pressure because the solubility of the HCFC-22 or the like in a polyol increases with an increase in pressure and a decrease in temperature. However, when the temperature is too low, the viscosity of the blend becomes too high, resulting in insufficient mixing. Further, when the pressure is too high, the plant costs will be expensive and the energy costs necessary for mixing will increase beyond preferred levels.

Therefore, the mixing is conducted under the temperatures and pressures sufficient for liquefying the low-boiling point foaming agent. The conditions for liquefaction depend on the specific foaming agent.

In the practice of the invention, the optimum mixing conditions may be determined in due consideration of these matters and the desired properties of the foamed product. The continuous mixing apparatus of the present invention may achieve an efficient mixing of the polyol with HCFC-22 in a short period of time and a precise manner without the use of an expensive pump.

Moreover, there is provided polyol feed passageways through which the polyol can be fed directly to the main mixing body. Further, there are also provided polyol circulation passageways connected to the main mixing body of the apparatus and low-boiling point foaming agent feed passageways connected to the polyol circulation passageways. Therefore, even when an accident has occurred in a plant which is producing rigid foamed polyurethanes, the polyol alone can be fed into the main mixing body, resulting in an easy mixing of the polyol with HCFC-22 or the like in predetermined proportions.

According to a second aspect of the invention, there is provided the continuous mixing apparatus in accordance with the first aspect of the invention, wherein a capillary is provided in the low-boiling point foaming agent feed passageways connect to the polyol circulation passageways. By the capillary, it is possible to feed the low-boiling point foaming agent to the polyol circulating in the polyol circulation passageways, without use of an expensive and sophisticated pump.

The capillary which is preferably used in the invention may be a pipe having a predetermined diameter and length, for example, about 1.5 mm to 3.0 mm in inside diameter, and a few to about 10 m in length, through which a predetermined and a small amount of the liquid HCFC-22 can be fed uniformly and proportionally into the polyol circulating in the circulation passageways.

By controlling the pressure, the feeding of an amount of HCFC-22 or the like, can be regulated to preferred ranges. The materials for the construction of the capillary are similar to those which are used in the construction of the mixing apparatus of the invention.

Any materials may be employed, provided they are anticorrosive in the presence of a polyol or HCFC-22 and the like, and do not contaminate the polyol or HCFC-22.

Examples of usable materials include stainless steel, copper, copper alloys, ceramics, glass, and the like.

According to a third aspect of the invention, there is provided continuous mixing apparatus in accordance with the first or second aspect of the invention, wherein a static mixer is provided in the polyol circulation passageways by which stream of the liquid low-boiling point foaming agent introduced from the low-boiling point foaming agent feed passageways is first premixed with the polyol circulating in the circulating passageways, followed by the feeding of the premixed stream into the main mixing body of the present apparatus.

When they are premixed with the aid of the static mixer in advance of the mixing in the main mixing body, the polyol and HCFC-22 or the like are more easily mixed in the main mixing body, resulting in a reduction of the mixing time and an increase in the efficiency, as well as the effect, of the mixing.

Any type, dimension or number of static mixer may be employed. Commercially available static mixers may be employed.

According to a fourth aspect of the invention, there is provided a continuous mixing apparatus in accordance with the first to third aspect of the invention, wherein a pressure adjustment device is provided in the polyol circulation passageways so that the establishment of a pressure of more than about 10 Kg/cm$^2$ can be achieved in the circulation passageways.

When the pressure is set at more than about 10 Kg/cm$^2$, the solubility of HCHC-22 or the like in a polyol increases, and HCFC-22 liquefies, preferably at about 20° C., under the pressure.

Once HCFC-22 is dissolved in a polyol at a pressure of more than about 10 Kg/cm$^2$, the saturated vapor pressure of the gas phase of the polyol blend is lowered, Therefore, it is possible to reduce the pressure of the main mixing body to about 1 to 2 Kg/cm$^2$. As a result, a conventional mixing body itself may preferably to be converted in the main mixing body of the present invention without a change of specifications.

Conventional pressure control valves may be employed as the pressure adjustment device.

According to a fifth aspect of the invention, there is provided a continuous mixing apparatus in accordance with the first to fourth aspect of the invention, wherein a heat exchange device is provided in the polyol circulation passageways so that the polyol temperature in the circulation passageways can be set at about 15° to 20° C.

When the temperature is lowered, the solubility of HCFC-22 or the like in the polyol increases. When the temperature is too low, the viscosity of polyol increases in a manner that is not preferred. Therefore, there is an optimum temperature range which varies depending on the specific foaming agent or polyol employed. Suitable temperature for the polyol in the polyol circulation passageways may be about 15° to 20° C. because HCFC-22 liquified at a temperature of about 20° C. and a pressure of about 10 Kg/cm$^2$ However, a temperature less than about 15° C. is not preferred because of an increase of the viscosity of polyol.

According to a sixth aspect of the invention, there is provided a continuous mixing apparatus according to the first to fifth aspect of the invention, wherein the low-boiling point foaming agent is HCFC-22.

The HCFC-22 employed in the invention has only a small value of ODP (Ozone Depletion Potential; an estimated value per unit mass for ozone-destroying power, based on CFC-11=1) of 0.05, and GHP (Greenhouse Potential; an estimated value per unit mass for greenhouse effect, based on CFC-12, i.e. $CCl_2F_2=1$) of 0.07.

The non-noxious HCFC-22 is available commercially as the main raw material of tetrafluoroethylene which is the monomer of polytetrafluoroethylene.

According to a seventh aspect of the invention, there is provided a continuous mixing apparatus in accordance with the first to fifth aspect of the invention, wherein the low-boiling point foaming agent is a HCFC-22 blend containing HCFC-142b.

In the present invention, it is preferred to employ the HCFC-22 blend containing HCFC-142b therein which the blend has little environmental problem such as above-described.

The non-noxious HCFC-142b which is used in combination with HCFC-22 in the present invention has a boiling point of $-9.2$, a ODP value of less than 0.05, and a GHP value of less than 0.2, these values being less than the corresponding values for HCFC-22.

Further, the gas permeability of the HCFC-142b present in the closed cells of the foamed product is lower than that of HCFC-22.

However, the use of HCFC-142b solely faces the problem of flammability of HCFC-142b.

Thus, we have discovered a novel foaming agent blend suitable for use in the manufacture of the polyurethane of the present invention, which blend consists essentially of about 40 to 60% by weight of HCFC-142b and about 60 to 40% by weight of HCFC-22. In this case, the blend may still retain its nonflammability. Moreover, the use of the foaming agent blend may prevent the impairment in the thermal insulating properties of the polyurethane on standing. By contrast, the use of HCFC-22 solely impairs rapidly the thermal insulating properties on standing, because of the high gas permeability of the HCFC-22.

When HCFC-142b is blended in an amount of 60% by weight or more based on the total weight of HCFC-22 and HCFC-142b, the blend becomes flammable, which is not preferred. When HCFC-142b is blended in an amount of 40% by weight or less, the preventative effect for the impairment in the insulating properties of the product on standing is insufficient.

Any polyol may be employed. Examples of suitable polyols include: polyesters prepared from a dimer acid and a glycol; polyesters prepared from adipic acid and phthalic acid triol; polyesters prepared from adipic acid, phthalic acid triol and a diol; diols such as polyoxypropylene glycols; poly (oxypropylene) poly (oxyethylene) glycols; polyoxybutylene glycols, polyoxytetramethylene glycols, poly (oxypropylene) triols; triols such as poly (oxypropylene) triols, poly (oxypropylene) poly (oxyethylene) triols, poly (oxypropylene) poly (oxyethylene) poly (oxypropylene) triols; sorbitol; pentaerythritol; sucrose; starch; polyoxypropylene plyols; poly (oxypropylene) poly (oxyethylene) polyols, and the like.

The molecular weight, the molecular distribution, numbers of hydroxy group and unsaturated bond of the polyol may be determined in consideration of the particular reactivity of the polyol employed, properties of the rigid foamed polyurethane obtained, and the like.

Impurities such as alkaline substances or aldehydes included in an industrial-grade polyol may have an adverse effect on the reaction. Therefore, a polyurethane-grade polyol is used preferably, it being available commercially.

Any low-boiling point foaming agent such as an organic or inorganic compound may be employed in the present invention provided that it is a gas at ordinary temperatures and pressures and has some degree of solubility in a polyol.

Examples of such foaming agents include HCFC-22; CHFC-124; HCFC-125; HCFC-132b; HCFC-133a; HCFC-134a; HCFC-142b; HCFC-152a; and the like which are substitutes for the specific chlorofluorocarbons (CFCs); various hydrocarbons; and $CO_2$ gas.

The amount of low-boiling point foaming agent which has been dissolved in a polyol may be determined by the measurement of liquid density, liquid viscosity, liquid pressure, or free foam density of the polyol blend containing the foaming agent. The amount may also be determined and regulated by continuous or discontinuous measurements of the blending proportions by use of a suitable instrument on the main mixing body of the present apparatus.

Although any isocyanate may be employed, examples of the suitable isocyanate of the present invention include aromatic isocyanates, aliphatic isocyanates, diisocyanates, polyisocyanates, hydrogenated derivatives thereof, masked isocyanates, crude isocyanates contaminated by polyureas, pretreated and prepurified condensation products thereof, and the like.

Examples of the concrete isocyanate include: 2,4-tolylene diisocyanate, 65/35 tolylene diisocyanate, 80/20 tolylene diisocyanate, 4,4'-diphenylmethanediisocyanate, methaxylilene diisocyanate, polymethylene polyphenyl isocyanate, hydrogenated tolylene diisocyanate, hydrogenated diphenylmethane diisocyanate, trimer of tolylene diisocyanate, a copolymer of hydrogenated diphenylmethane diisocyanate with trimer of tolylene diisocyanate, and the like. These are available commercially.

Any process, instrument or equipment may be employed for the manufacture of the polyurethane of the invention by use of the isocyanate and polyol abovementioned, water, HCFC-22 or the like as the foaming agent, a catalyst, and additives. The catalyst and additives are also available commercially.

Any batchwise or continuous foaming process for the manufacture of the foamed products may be employed. One process involves a one-shot foaming process wherein an isocyanate, a polyol, water, HCFC-22 or the like, a catalyst, and additives are simultaneously mixed and reacted to foam. The other process involves a prepolymer foaming process wherein a prepolymer having terminal isocyanate or hydroxy groups, prepared by reacting an isocyanate with a polyol, is reacted to foam in the presence of a catalyst and foaming agent. A low-pressure free foaming process or a high-pressure foaming process may be also employed. Further, a mechanical foaming process, such as a froth process at ordinary or elevated temperature, or a non-froth process may be employed.

The cell size of the foamed product obtained may also be affected by the stirring velocity, the mixing rate, the mixing speed, the back pressure of the mixing head, the size of the orifice, the kind of impeller, and the shape or structure of the mixing head. Therefore, optimum combinations of these matters should be determined depending on the desired properties of the product.

When the polyol is mixed with the low-boiling point foaming agent, the following materials may be additionally incorporated, depending on the purpose, in so far as they do not deviate from the gist of the present invention: an organic filler, an inorganic filler, an antioxidant, a lubricant, an organic or inorganic pigment, an ultraviolet inhibitor, a dispersant, a neutralizing agent, a plasticizer, a nucleating agent, and the like.

By the present invention, it is possible to provide a continuous apparatus for the efficient and uniform mixing of a polyol and a low-boiling point foaming agent for the manufacture of a rigid foamed polyurethane.

This polyurethane is manufactured by use of raw materials such as a polyol, an isocyanate, water, and HCFC-22 or the like as the foaming agent. The polyurethane is made up substantially of closed cells which are homogeneously distributed with no froth voids. Therefore, the foamed polyurethane obtained by the present invention has good mechanical, sound insulating and electrical properties, good dimensional stability, and chemical and flame resistance. It must be emphasized that the foamed polyurethane of the invention is made up substantially of closed cells which contain HCFC-22 and $CO_2$ gas therein, and has good thermal insulating properties in cold circumstances over a temperature of from a tank 6 to $-30°$ to $-40°$ C. Thus, the insulating materials made from the foamed polyurethane are suitable for use in making refrigerators for household or industrial use, freezers, cold-storage cars, iceboxes, containers for frozen food, and the like.

Further, when employing a HCFC-22 blend containing a specific amount of HCFC-142b as foaming agent, there is provided a rigid foamed polyurethane having less change in thermal insulating properties on standing while retaining the good flame resistance of the rigid foamed product.

The chlorodifluoromethane, HCFC-22, or chlorodifluoroethane, HCFC-142b, have hydrogen atoms in the molecule and a short life in the atmosphere. Therefore, they have little environmental problem.

DESCRIPTION OF THE PREFERRED EMBODIMENTS

Figure 1:
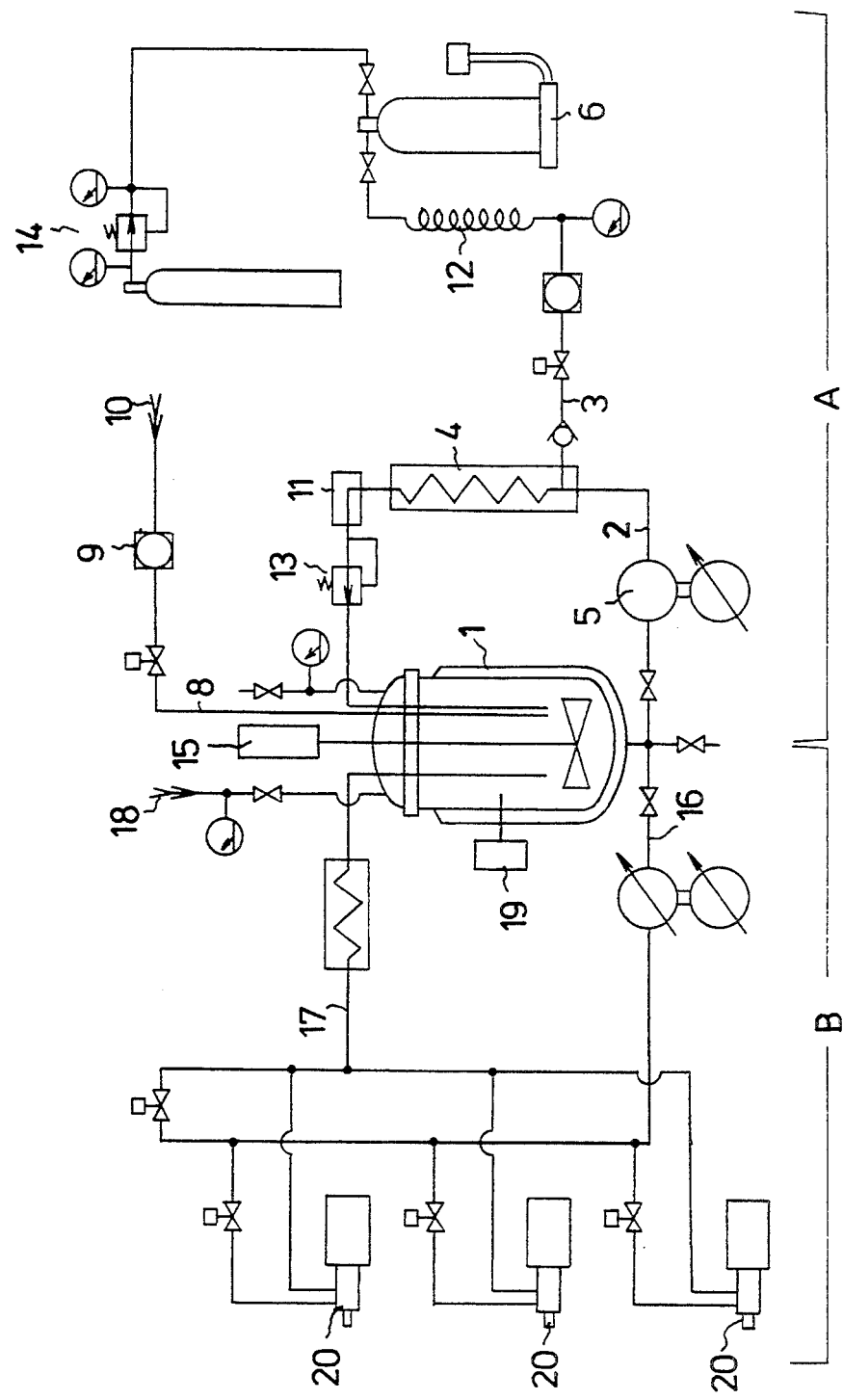
FIG. 1 is a schematic illustration of the mixing apparatus of the present invention.

In FIG. 1, the mixing apparatus of the present invention comprises an HCFC-22 loading section (A) and a metering section (B) of a foaming machine.

In the apparatus, HCFC-22 is fed proportionally (about 10 g/sec.) from tank 6 through capillary 12 (1.8 mm in inside diameter, 10 m in length; stainless steel) by means of nitrogen gas or the like 14 which is used as a carrier gas, the HCFC-22 is carried through feed passageways 3 to polyol circulation passageways 2. Static mixer 4 sufficiently premixes the HCFC-22 with the circulating polyol (about 10 liter/min.) in the circulation passageways, followed by cooling to about 20° C. by means of heat exchange device 11. Pressure regulator 13 regulates the pressure in the region within the section from polyol circulation pump 5 to the pressure regulator 13 to maintain the pressure at about 12 $Kg/cm^2$ and the polyol blend containing HCFC-22 is then fed to main mixing body 1.

In the mixing body 1, the polyol blend is mixed at a temperature of about 20° C. and pressure of about 2 $Kg/cm^2$ (vapor phase). The main body is equipped with polyol feed passageways 8 through which the polyol can be directly fed from polyol storage tank 10 via flow meter 9 to the main mixing body 1, stirrer 15, polyol circulation passageways 2 equipped with polyol circulation pump 5, polyol blend containing HCFC-22 outlet 16, and polyol blend circulation passageways 17, nitrogen feed passageways 18, HCFC-22 concentration measurement meter 19.

Machine head 20 inject the polyol blend containing HCFC-22 to a mold (not shown).

EXAMPLES

The following Examples will further illustrate the present invention, which by no means limit the invention.

A rigid foamed polyurethane sample was prepared in accordance with the following recipes (see Table 1), in a mold by means of a foaming machine equipped with a large mixing head.

The properties of the sample foams are given in Table 1.

TABLE 1

| (Unit: Part by Weight) | | | | |
|---|---|---|---|---|
| | Example | | | Comparative Example |
| | 1 | 2 | 3 | 1 |
| Component A | | | | |
| Polyol | 100 | 100 | 100 | 100 |
| Foaming agent | | | | |
| HCFC-22 | 10 | 6 | 7 | — |
| HCFC-142b | — | 4 | — | — |
| CFC-11 | — | — | — | 16 |
| Catalyst | 0.64 | 0.64 | 0.64 | 0.64 |
| Silicone dispersant | 0.64 | 0.64 | 0.64 | 0.64 |
| Water | 1 | 1 | 1 | 1 |
| Component B | | | | |
| Isocyanate | 140 | 140 | 140 | 140 |
| HCFC-22 | — | — | 3 | — |
| Properties of Rigid Foamed Polyurethane | | | | |
| Density ($Kg/m^3$) | 34 | 34 | 34 | 34 |
| Closed cell (%) | 95 | 95 | 95 | 95 |
| Compressive strength ($Kg/cm^2$) | 2.4 | 2.4 | 2.4 | 2.4 |
| Dimensional stability | | | | |
| $-30°$ C.*48 hrs.(vol. %) | +0 | +0 | +0 | +0 |
| $+70°$ C.*48 hrs.(vol. %) | +10 | +5 | +10 | +5 |

TABLE 1-continued (Unit: Part by Weight)

|  | Example 1 | Example 2 | Example 3 | Comparative Example 1 |
|---|---|---|---|---|
| Thermal conductivity (Kcal/mh., °C.) Temperature Gradient |  |  |  |  |
| (1): from +37.7 to +10 | 0.017 | 0.017 | 0.017 | 0.016 |
| (2): from +15 to −15 followed by (1) | 0.016 | 0.016 | 0.016 | 0.017 |
| (3): from +37.5 to +10 followed by (2) after 5 weeks on standing at 70° C. | 0.024 | 0.021 | 0.024 | 0.020 |
| Change in thermal conductivity (%) of the samples tested | +41 | +24 | +41 | +25 |
| Flammability | self | self | self | self | self: self extinguish

Examples 1 to 3 give the blending proportions of the raw materials employed and the results which measure the properties of the resultant rigid foamed polyurethanes.

Example 2 gives the effect of using HCFC-142b as foaming agent in place of a part of HCFC-22, resulting in a rigid foam having the same properties as in Example 1 but less change in the thermal conductivity on standing while retaining its nonflammability.

Example 3 gives the effect of using an isocyanate blend which contains a part of HCFC-22 which should be otherwise incorporated into the polyol. The results indicate that a rigid foamed polyurethane may be prepared in the same way as in Examples 1 and 2, with the same properties of the foam obtained in Example 1. In this case, the vapor pressure of the gas phase in the mixing vessel dropped by about 0.5 Kg/cm$^2$, resulting in additional latitude for selecting the compounding conditions.

Referential Example 1 gives the results obtained by use of CFC-11 as a foaming agent which links to global warming and ozone-layer destruction.

What is claimed is:

1. A method of mixing a low-boiling point foaming agent with polyol for producing rigid polyurethane foam comprising the steps of:
   producing a pre-mixture of a polyol and a foaming agent as a blend of chlorodifluoromethane (HCFC-22) and chlorodifluoroethane (HCFC-142b), with HCFC-22 being in the range of 40-60% of the blend and HCFC-142b in the range of 60-40% and having a low boiling point below 0° C. at a low temperature and at a pressure sufficient to maintain the foaming agent in a liquid state,
   transferring the pre-mixture in liquid form to a main mixing body,
   mixing said pre-mixture in said main mixing body, and
   discharging the final mixture from the main mixing body.

2. A method as in claim 1 wherein the pre-mixture is transferred to said main mixing body without pumping and without further mixing.

3. A method as in claim 1 wherein said step of producing the pre-mixture comprises:
   feeding the polyol through a polyol circulation passageway to a static mixer in which the pre-mixture is formed;
   feeding the foaming agent in a liquid state to the static mixer; and
   the transferring step comprises moving said pre-mixture in liquid form from said static mixer to said main mixing body.

4. A method as in claim 3 further comprising the step of maintaining the pressure in the polyol circulation passageway at least about 10 Kg/cm$^2$.

5. A method as in claim 4 further comprising the step of maintaining the pressure of the main mixing body in the range of 1 to 2 Kg/cm$^2$.

6. A method as in claim 4 further comprising the step of maintaining the temperature in the polyol circulation passageway at a temperature in the range of from about 15° to 20° C.

7. A method as in claim 3 wherein the feeding of the foaming agent is fed through a capillary feed passageway.

8. A method as in claim 3 further comprising the step of maintaining the temperature in the polyol circulation passageway at a temperature in the range of from about 15° to 20° C.

9. A method as in claim 1 further comprising the step of adding an isocyanate to the pre-mixture.

10. A method as in claim 9 further comprising the step of further adding a blend of isocyanate and HCFC-22 to the polyol in the pre-mixture stage.

11. A method as in claim 10 further comprising adding to the pre-mixture a blend of isocyanate of 140 parts by weight and HCFC-22 of 3 parts per weight to the pre-mixture.

12. A method of mixing a low-boiling point foaming agent with polyol for producing rigid polyurethane foam comprising the steps of:
   producing a pre-mixture of a polyol and at least one foaming agent having a low boiling point below 0° C. at a low temperature and at a pressure sufficient to maintain the foaming agent in a liquid state,
   transferring the pre-mixture in liquid form to a main mixing body,
   adding polyol to the pre-mixture in the main mixing body, and
   discharging the final mixture from the main mixing body.

13. A method as in claim 12 wherein the foaming agent has a boiling point substantially below 0° C.

14. A method as in claim 12 wherein the low boiling point foaming agent is chlorodifluoromethane (HCFC-22).

15. A method as in claim 12 wherein the low boiling point foaming agent is chlorodifluoromethane (HCFC-22).

16. A method as in claim 12 wherein the foaming agent is chlorodifluoromethane (HCFC-22) blended with chlorodifluoroethane (HCFC-142b).

17. A method as in claim 16 wherein the HCFC-22 is about 6 parts by weight, the HCFC-142b is about 4 parts by weight and the polyol is about 100 parts by weight of the pre-mixture.

18. A method as in claim 12 wherein the HCFC-22 is in the range of 7 to 10 parts by weight and the polyol is about 100 parts by weight of the pre-mixture.

19. A method as in claim 12 wherein the foaming agent is a blend of HCFC-22 and HCFC-142b, with HCFC-22 being in the range of 40–60% of the blend and HCFC-142b in the range of 60–40%.

* * * * *